C. F. AND I. C. WILLIAMS.
SEPARATOR FOR STORAGE BATTERIES.
APPLICATION FILED MAR. 15, 1918.
1,396,390.
Patented Nov. 8, 1921.
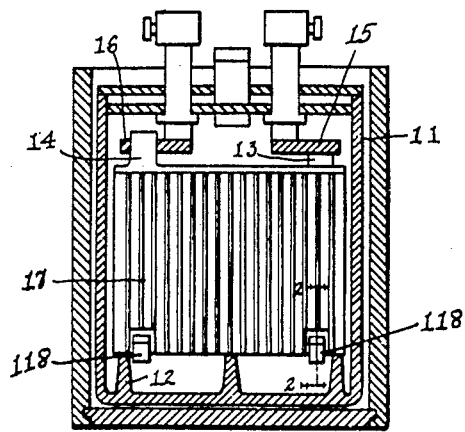
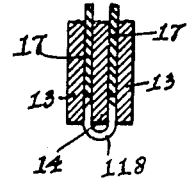
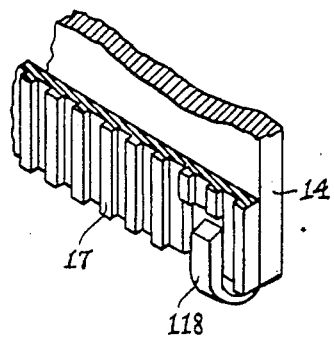
INVENTOR.
IRA C. WILLIAMS
BY and CHAS. F. WILLIAMS
Ira J. Adams
ATTORNEY

UNITED STATES PATENT OFFICE.

CHARLES F. WILLIAMS AND IRA C. WILLIAMS, OF DE LONG, INDIANA, ASSIGNORS TO NATIONAL CARBON COMPANY, INC., A CORPORATION OF NEW YORK.

SEPARATOR FOR STORAGE BATTERIES.

1,396,390.  Specification of Letters Patent.  Patented Nov. 8, 1921.

Original application filed February 21, 1917, Serial No. 150,144. Divided and this application filed March 15, 1918. Serial No. 222,568.

*To all whom it may concern:*

Be it known that we, CHARLES F. WILLIAMS and IRA C. WILLIAMS, citizens of the United States, and residents, respectively, of De Long, in the county of Fulton and State of Indiana, and De Long, in the county of Fulton and State of Indiana, have invented a certain new and useful Improvement in Separators for Storage Batteries, of which the following is a full, clear, and exact description.

This invention, which is a division of our case filed February 21, 1917, Serial No. 150,144, relates to the construction of storage batteries and more especially to the means for separating the negative and positive plates from each other.

The common type of construction such as is used in storage batteries now on the market is a wood fiber separator which is inserted between the positive and negative plates to prevent their making contact with each other which would produce a short circuit, and also to absorb and distribute the acid over the surfaces of the plates. The separator is commonly made of wood fiber and is very thin and corrugated. As a result of this construction, when the batteries become over-charged or heated the plates will warp and mash the wood pulp so that the edges are worn away and eventually the plates will come in contact with each other, thereby causing a short circuit and destroying the life of the battery. On the other hand, the wood pulp will in time disintegrate or wear away so that the plates will be free to make contact with each other which will produce the same results.

The object of this invention is to overcome the difficulty encountered in the above construction and give the batteries a much longer life by providing a means for separating the plates, which will be strong and impervious to the acid of the batteries, so that the plates will at all times be separated. This is accomplished by clamping a spacer onto the bottom end of every other plate, so as to protect said plate from the adjacent plate, as will be hereinafter shown and described. This construction will at all times prevent the plates from coming into contact with each other and causing a short circuit.

The full nature of the invention will be understood from the accompanying drawings and the following description and claims:

Figure 1 is a vertical cross section through a storage battery, showing the spacing clip in front elevation. Fig. 2 is a cross section on the line 2—2 of Fig. 1, showing only three plates and two separators with one spacing clip. Fig. 3 is an enlarged view of a portion of a spacing clip in position with the porous separator and plates. Fig. 4 is a perspective view of a spacing clip.

In the drawings there is shown a battery box 10 which contains a cell 11 which is filled with acid not shown. Projecting upwardly from the bottom of the cell there are a plurality of flanges 12 on which the negative plates 13 and positive plates 14 rest. Connecting the negative plates 13 with each other there is a connecting strap 15, and the connecting strap 16 connects the positive plates 14 to each other. So much of the construction as has been described is that ordinarily used in the forming of storage cells.

Between each pair of plates there is inserted a separator 17 which is corrugated on one side as shown in Fig. 3. This separator is generally formed of wood pulp which will insulate the plates from each other and also absorb the acid and cause it to attack the full surfaces of the plates. To prevent the plates mashing these wooden pulp separators when they warp from an over-charge or over heating so as to come in contact with each other and short circuit the battery, there is provided a plurality of rigid acid-resisting separating or spacing clips 118 which are bent in horseshoe shape, as shown in Fig 4, and are slipped over the bottom edge of the positive plate to separate it from the negative plates on each side as shown in Fig. 2.

It is preferable that the separator 17 be cut away at the point at which the separating block 118 is inserted so as not to bulge or crowd the plate, and to relieve the wood separator of the pressure of the adjacent plates. This type of separating block is preferably used in repairing old plates which have the ordinary type of separator, but in my copending case above referred to another form is disclosed that is more particularly adapted to be used with new separators. The main portion is made of wood or like material which is relatively soft and may be distorted or cut by pressure or chafing, and the hard and comparatively indestructible blocks are designed to relieve the main portion, insuring much longer life without greatly reducing the greatly desired porosity.

It will be understood that this invention is not limited to the special material suggested in the specification, nor to the specific shape shown in the drawings, but any suitable material may be used and in any form which would be applicable for the purpose specified.

Having described our invention, what we claim is:

1. In electric batteries in combination with the positive and negative plates, an acid-resisting separating member secured to one of the plates and projecting laterally from both sides thereof in contact with the adjacent plates to hold them in spaced relation to the former and porous separators between the said plates having openings to receive said members.

2. In electric batteries in combination with the positive and negative plates, a U-shaped acid-resisting separating clip extending around the edge of one plate and contacting with the adjacent plates at both sides thereof and porous separators between said plates having openings to receive the ends of said clip.

3. For use in batteries a U-shaped acid-resisting separating clip adapted to be secured to the edge of a plate and porous separators having notches in an edge adapted to receive the ends of the said clip when placed in contact with the said plate.

4. In electric batteries the combination of positive and negative plates, acid-resisting separating members secured to alternate plates and contacting with the adjacent plates and porous separators between the plates having openings to receive the said members.

In testimony whereof, we hereunto affix our signatures.

CHARLES F. WILLIAMS.
IRA C WILLIAMS.